US006383542B1

(12) United States Patent
Khodor et al.

(10) Patent No.: US 6,383,542 B1
(45) Date of Patent: May 7, 2002

(54) METHOD AND APPARATUS FOR PREPARING AND DISPENSING A COMBINATION OF FOOD PRODUCTS IN A VENDING MACHINE

(76) Inventors: Leonid Khodor; Inna Khodor, both of 4920 Brainard Rd., Orange, OH (US) 44022

( * ) Notice: Subject to any disclaimer, the term of this patent is extended or adjusted under 35 U.S.C. 154(b) by 0 days.

(21) Appl. No.: 09/511,253

(22) Filed: Feb. 23, 2000

(51) Int. Cl.[7] .............................. A23C 3/02; A47J 37/04

(52) U.S. Cl. ......................... 426/416; 426/523; 99/341; 99/357; 99/443 R; 221/1; 221/150 A; 221/312 C; 222/1; 222/146.2

(58) Field of Search ................................ 426/105, 416, 426/420, 523; 99/341, 357, 443 R; 222/1, 146.2–146.5; 221/1, 150 HC, 150 A, 157, 312 C

(56) References Cited

U.S. PATENT DOCUMENTS

| | | | | |
|---|---|---|---|---|
| 2,794,384 A | | 6/1957 | Sierk et al. | 99/357 |
| 3,117,511 A | | 1/1964 | Everett | 99/357 |
| 4,051,772 A | | 10/1977 | Johansson et al. | 99/427 |
| 4,592,485 A | | 6/1986 | Anderson et al. | 221/150 HC |
| 5,400,699 A | | 3/1995 | Cailbault | 99/357 |
| 5,555,793 A | * | 9/1996 | Tocchet et al. | 99/326 |
| 5,873,299 A | | 2/1999 | Leykin | 99/357 |

* cited by examiner

*Primary Examiner*—Keith Hendricks
*Assistant Examiner*—Drew Becker

(57) ABSTRACT

Method and apparatus for preparing and dispensing a combination of food products in a vending machine from a selection of components prepackaged in a plurality of trays sealed with a single peel off tape. The method comprises dispensing a top component onto a positioning releasable support and moving it into an oven, independently dispensing a tray with bottom component, sliding it to and raising into a moveable oven, independently heating components, removing components from ovens, moving said moveable oven out of the tray path, moving components to close proximity of each other and releasing top component into the tray. The apparatus has means for dispensing each of the individual components toward front of said vending machine; means for three-dimensional positioning of the releasable support for top components; means for bottom component tray lateral displacement; stationary oven, moveable oven, and an elevator laterally aligned with said product delivery opening.

12 Claims, 8 Drawing Sheets

METHOD AND APPARATUS FOR PREPARING AND DISPENSING A COMBINATION OF FOOD PRODUCTS IN A VENDING MACHINE

BACKGROUND—FIELD OF INVENTION

This invention relates to a method and apparatus for preparing and dispensing a combination of food products in a vending machine, specifically to automatic assembling two or more food articles with different preparation conditions in a single product and delivering it to a consumer. One specific application of the present invention is for use in a hot dog vending machine.

BACKGROUND—DESCRIPTION OF PRIOR ART

Automatic dispensing of hot dishes in public places raises numerous problems, especially when a food product comprises at least two articles with different optimal storage and preparation conditions. For example, for automatic handling of food products it is difficult to maintain adequate sanitary conditions comparable to the conditions of specialized production. Other problems, prohibitive for a vending machine, include a complexity of handling devices and relatively long preparation time.

Automatic hot food dispensing apparatuses are known in the art. Hot dog vending machines according to U.S. Pat. Nos. 2,794,384 and 3,117,511 store refrigerated sausage already assembled with a bun in a box. These vending machines pierce electrodes into the sausage to heat it with electric current. This method creates a health hazard as well as an inferior taste because moisture from the hot sausage enters the bun.

A machine for dispensing heated sausage according to U.S. Pat. No. 4,051,772 separately dispenses a piece of bread, packaged condiments, and heated sausage in two-part sleeve. The sleeve protects a sausage and the machine from contamination, but leaves actual preparation of a hot dog, which includes removing a hot sausage from the sleeve, to a consumer.

An automatic food dispenser according to U.S. Pat. No. 5,400,699, dispenses food components from trays joined together in a chain by a "peel-off" tape which also serves as a lid for each of the trays. The chain is fed so that the trays are upside down above a receptacle with the tape peeled off in the immediate vicinity of said receptacle. A food component falls into the receptacle where it is heated and further discharged into one of the previously emptied trays. This arrangement provides for a simple dispenser, but it is not satisfactory for meat products because it reuses a tray without sterilization. Also, it has no provisions for combining separate food articles into a finished product.

A meal vending apparatus according to U.S. Pat. No. 4,592,485 stores refrigerated fully cooked meal packages, which include hot and cold portions, with the cold portions being protected by a microwave shield. The package is heated in a microwave oven before dispensing it to a consumer. Although the apparatus is capable of creating somewhat different thermal conditions for different kinds of food, it requires expensive packaging process and leaves the final assembly to a consumer.

A machine for dispensing food items according to U.S. Pat. No. 5,873,299 separately stores in a refrigerator a number of sausage packages and individually packed buns. Sausage packages are attached to conveyer carriers, which move intermittently on demand past opening and extracting devices. An opening device creates multiple cuts in the package top and bottom through which, after the next move, an extracting device pushes a sausage out. The sausage drops through an opening in the refrigerator bottom into a holder. The holder carries the sausage into the infrared heater. Boxes with buns are stacked in cassettes attached to a conveyer. After the holder comes to the heater, a pusher lifts the stack until upper box is against the holder. On its way back after the heating, the holder engages the box, pushes it past box cutter, and places the sausage into the bun through a cut created in the box. The box is further pushed onto an elevator that lifts it into a microwave oven. After the box with the sausage placed into the bun is heated, the elevator comes back and another pusher displaces the box into delivery cup.

Although the machine assembles two articles into one item and has different storage and heating conditions for different kinds of food, it suffers from a number of disadvantages. They include inefficient and hard to control infrared heating, undesirable cooling of a sausage after heating, lengthy cycle time as a result of sequential heating, cross contamination as a result of multitude of parts contacting and actually cutting into food product, very limited food storage capacity, complexity of food handling devices as well as, directly linked to it, sanitary and maintenance issues.

Furthermore, consumer's waiting time is a significant consideration for the marketability of a hot food vending machine. Although preparation time can not be eliminated, it can be made enjoyable for a user. All of the above-described technical solutions have no provisions for entertaining a consumer during the preparation time.

OBJECTS AND ADVANTAGES

Accordingly, objects of the present invention are:

- to provide improved sanitary conditions in such manner that number of food contacting parts is kept to a minimum and the parts are automatically sterilized;
- to provide a method which allows for decreasing preparation time;
- to provide a view of the apparatus movements as means for user entertainment during the preparation time; and
- to provide for both wider selection and greater capacity of food product in a vending machine.

Further objects and advantages will become apparent from a consideration of the ensuing description and drawings.

SUMMARY

In accordance with present invention a method for preparing and dispensing a combination of food products in a vending machine with a product delivery opening from a selection of components where individual components are prepackaged in a plurality of trays sealed with a single peel off tape comprising the steps of placing a support to a selected top component location while independently dispensing a tray with a bottom component by pulling the sealing tape over a tray guide positioned at 45 to 85 degrees angle clockwise in relation to the front plane of said vending machine, releasing top component onto said support by pulling the sealing tape under a guide positioned at 5 to 45 degrees angle clockwise in relation to said front plane, moving said support away from said guide in a direction to said front plane until said support is clear for lateral displacement, moving said tray and said top component independently along said front plane until they are laterally aligned with said delivery opening and means for thermal processing, moving said top component in a direction away from said front plane into a stationary means for thermal processing and heating the component while independently raising said tray into a moveable means for thermal processing and heating said tray; lowering said tray and displacing said moveable means for thermal processing out of the tray path, raising said tray past the moveable means for thermal processing while independently removing said top component from the stationary means for thermal processing and lowering it to a close proximity of said tray, releasing said top component into said tray, aligning said tray vertically with said delivery opening and said moveable means for thermal processing, and placing said moveable means for thermal processing in starting position.

Also, in accordance with present invention an apparatus for preparing and dispensing a combination of food products in a vending machine with a product delivery opening from a selection of components where individual components are prepackaged in a plurality of trays sealed with a single peel off tape comprising means for dispensing each of the individual components toward front of said vending machine; means for three-dimensional positioning of a releasable support for top components; means for tray lateral displacement; stationary means for thermal processing, moveable means for thermal processing, and means for tray vertical displacement laterally aligned with said product delivery opening.

DRAWING FIGURES

Figure 6B:
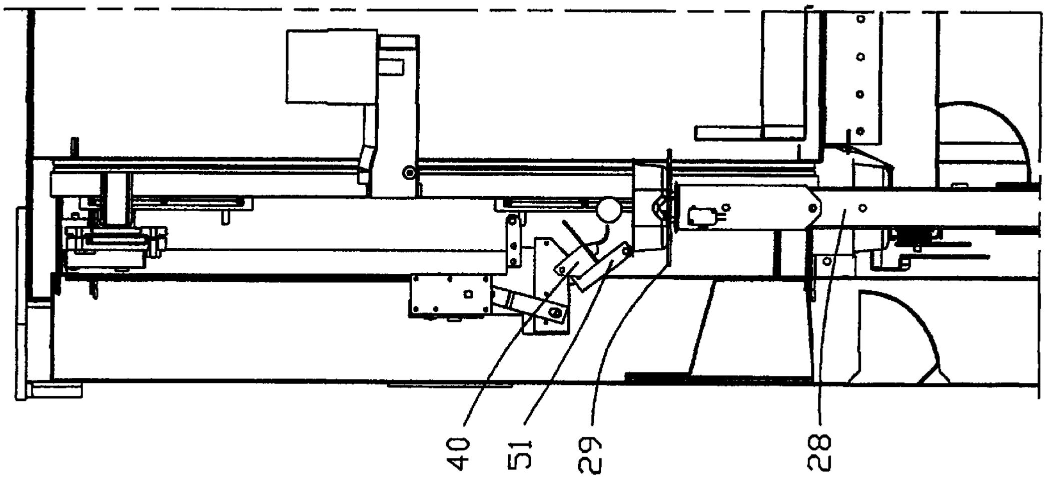
Figure 6A:
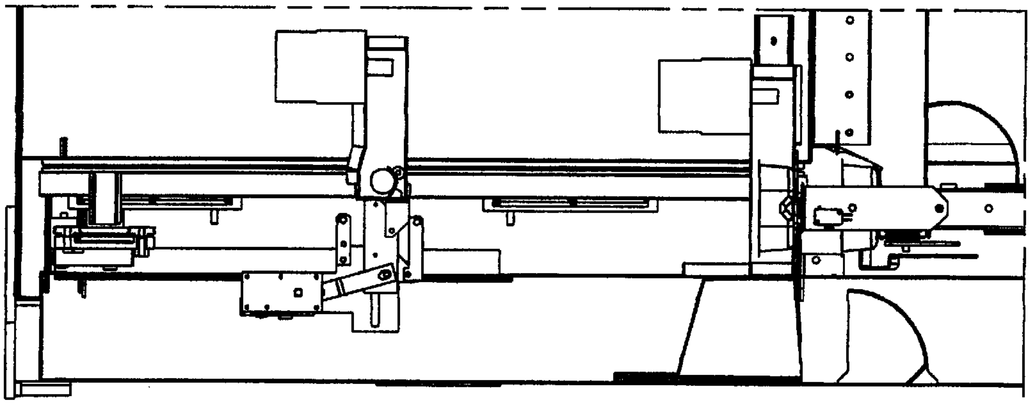
Figure 6:
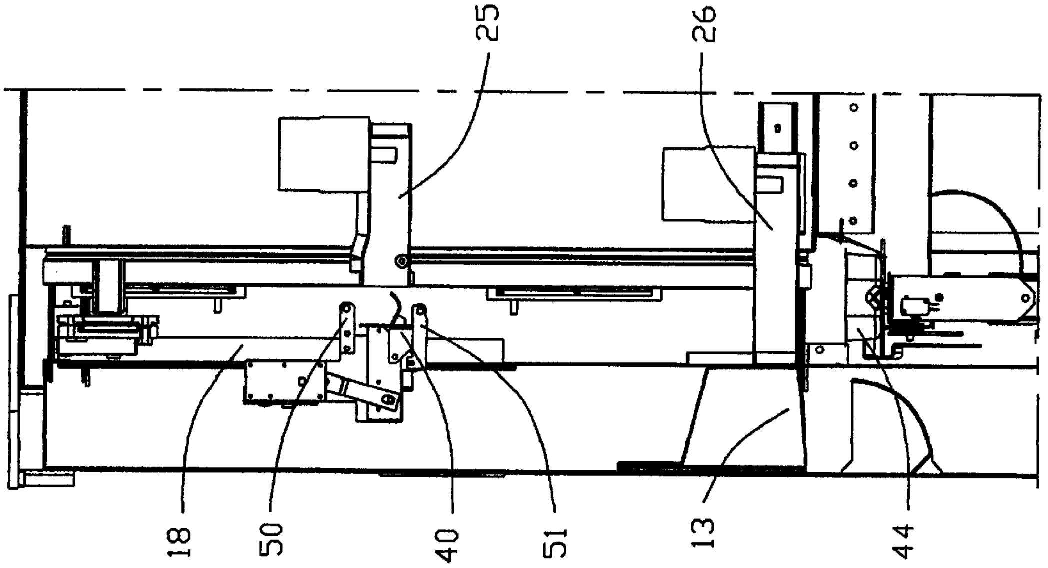

FIGS. 6, 6A, and 6B show side section of the apparatus through delivery cup.

DESCRIPTION—BASIC EMBODIMENT

Figure 1:
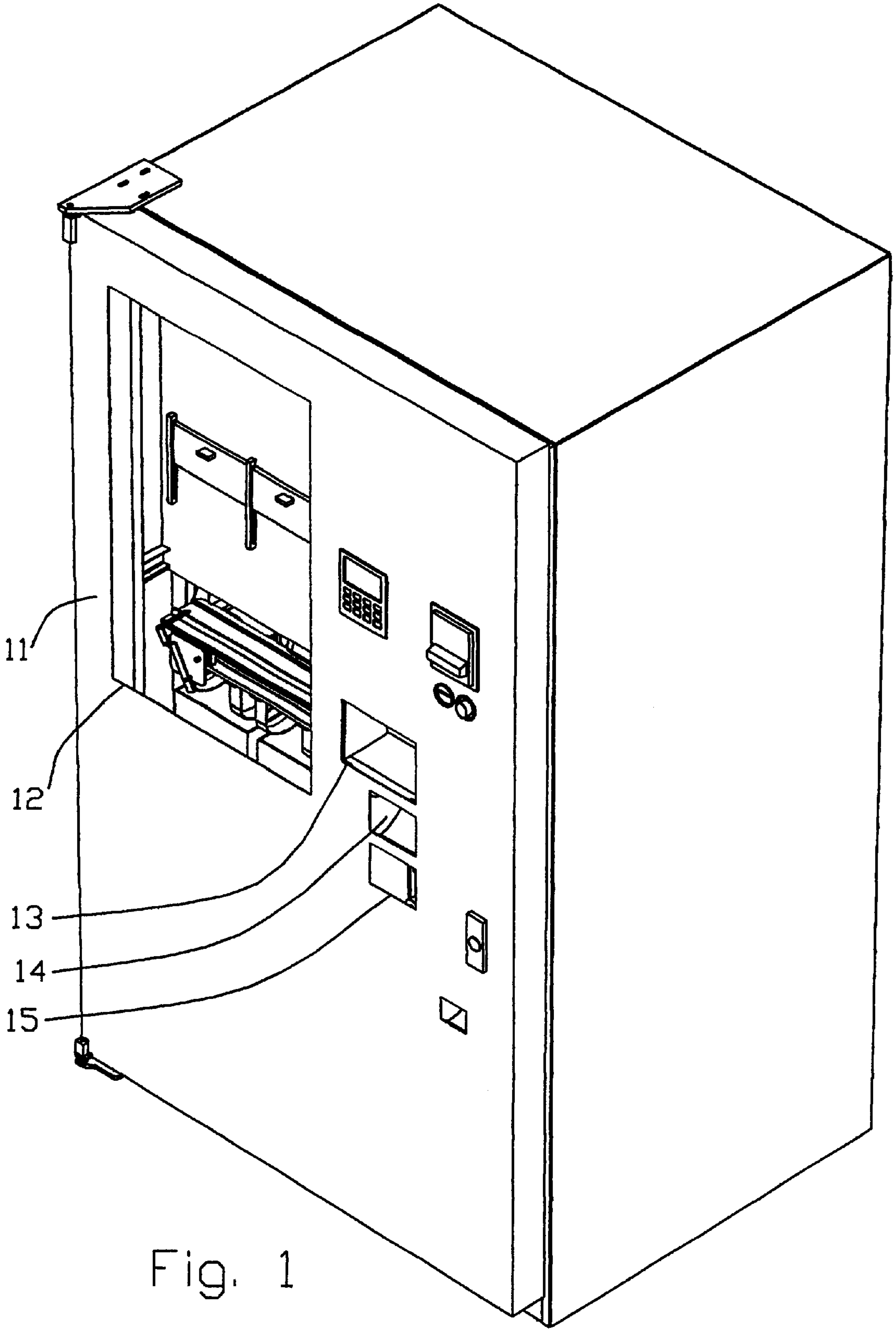
FIG. 1 shows perspective view of a vending machine for preparing and dispensing combination of food products.
Figure 2:
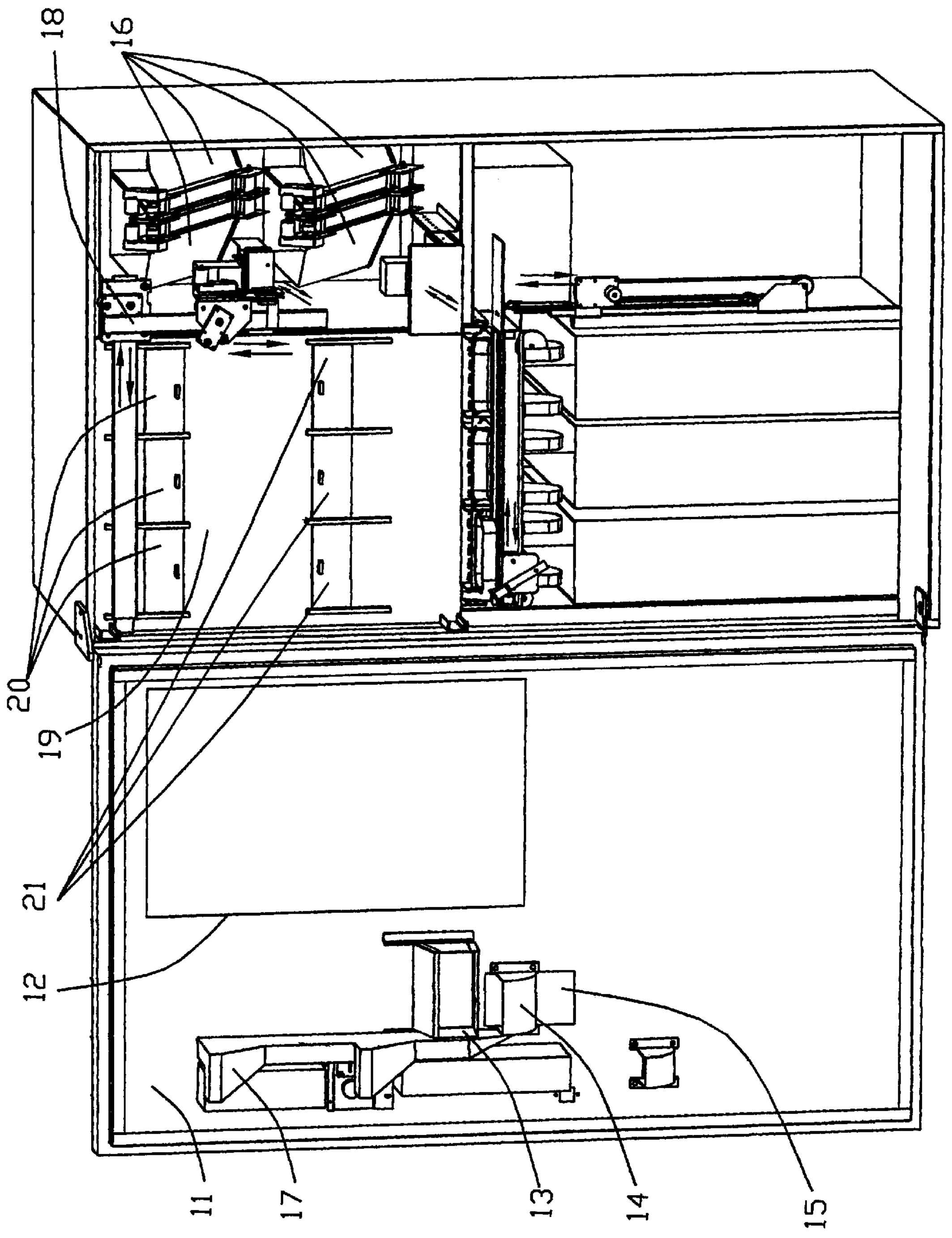
FIG. 2 shows perspective view of the machine with an open door.
Figure 3:
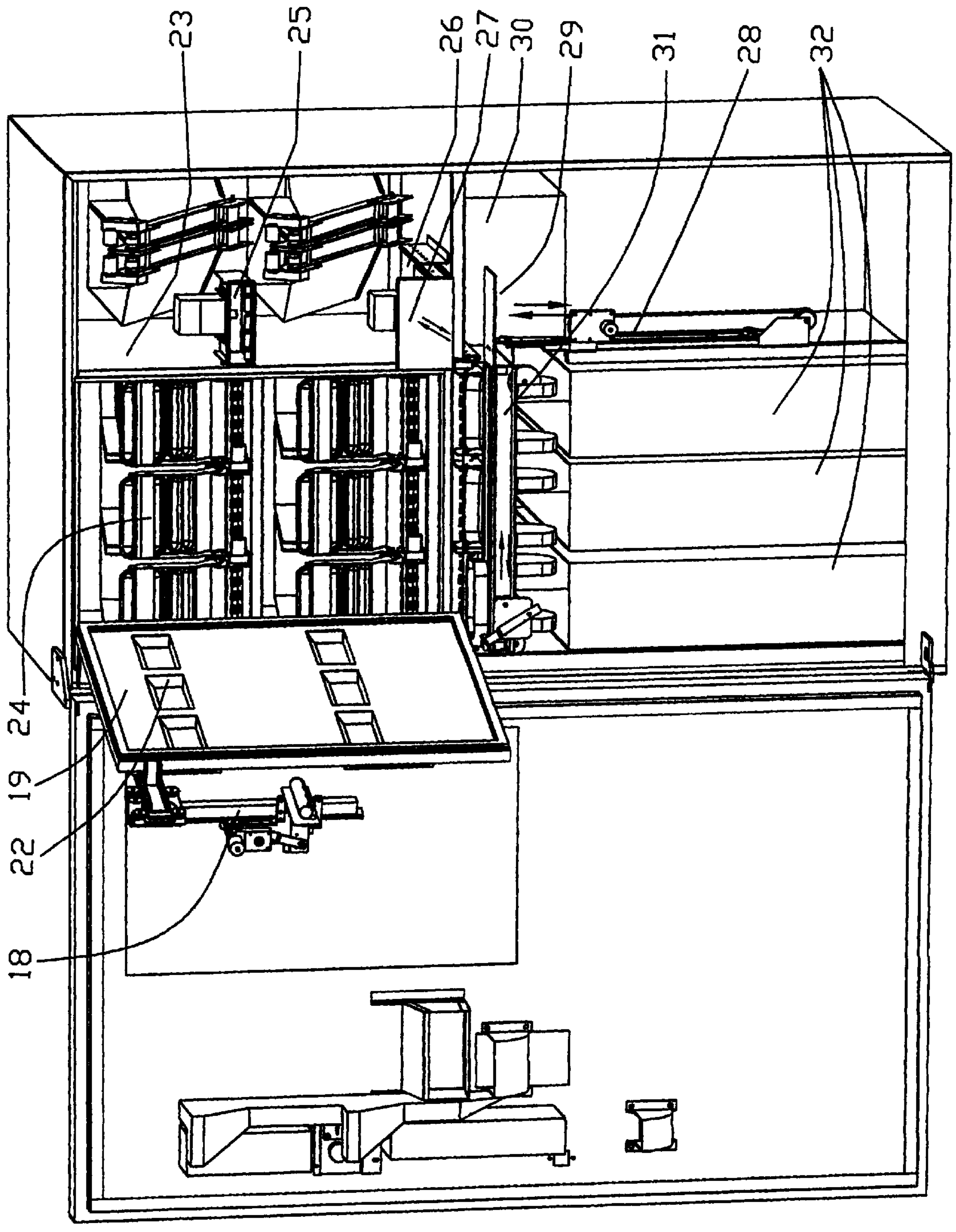
FIGS. 3 and 3A show perspective view of the machine with an open door, an open top component storage, and various optional dispensers.

A basic embodiment of the method and apparatus of the present invention is illustrated as a hot dog vending machine. The machine (FIG. 1) includes door 11 with window 12, product delivery shelf 13, packaged condiments delivery cup 14, and courtesy supplements opening 15. Opening 15 is optional and can be used as an access to napkins, salt, toothpicks, and so on. Packaged condiment dispensers 16 (FIG. 2) are positioned behind door 11 and are in alignment with shoot 17, which terminates into cup 14. Dispenser 16 is device known in the art that feeds small packages one at a time from a bulk. Three-dimensional linear positioning device 18 fastens to sausage storage door 19 that has gravity return upper covers 20 and spring loaded up lower covers 21. Door 19 (FIG. 3) has openings 22, which are normally closed with covers 20 and 21. Sausage storage 23 has two rows of sausage dispensers 24. Stationary oven 25 and moveable oven 26 may be microwave, induction or any other heating device known in the art that have high energy transfer rate. Said moveable oven 26 has part 27 for pushing trays onto shelf 13. Ovens 25, 26 and elevator 28 with landing 29 position behind and laterally aligned with shelf 13. Refrigerating unit 30 and tray guide 31 reside underneath storage 23. Bun magazines 32 stand on the machine floor under them.

Figure 4:
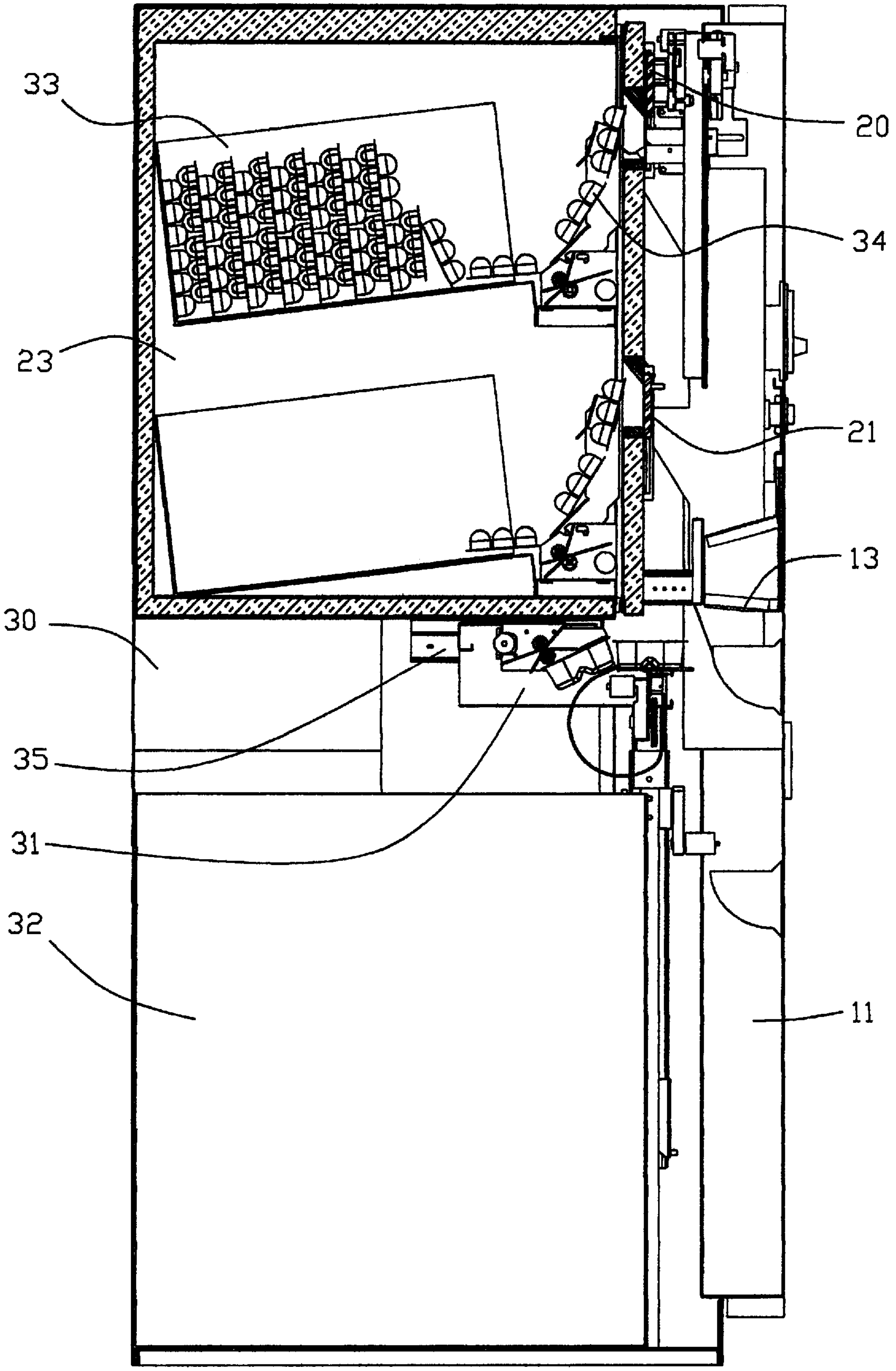
FIG. 4 shows side section of the apparatus through dispensers.
Figure 4A:
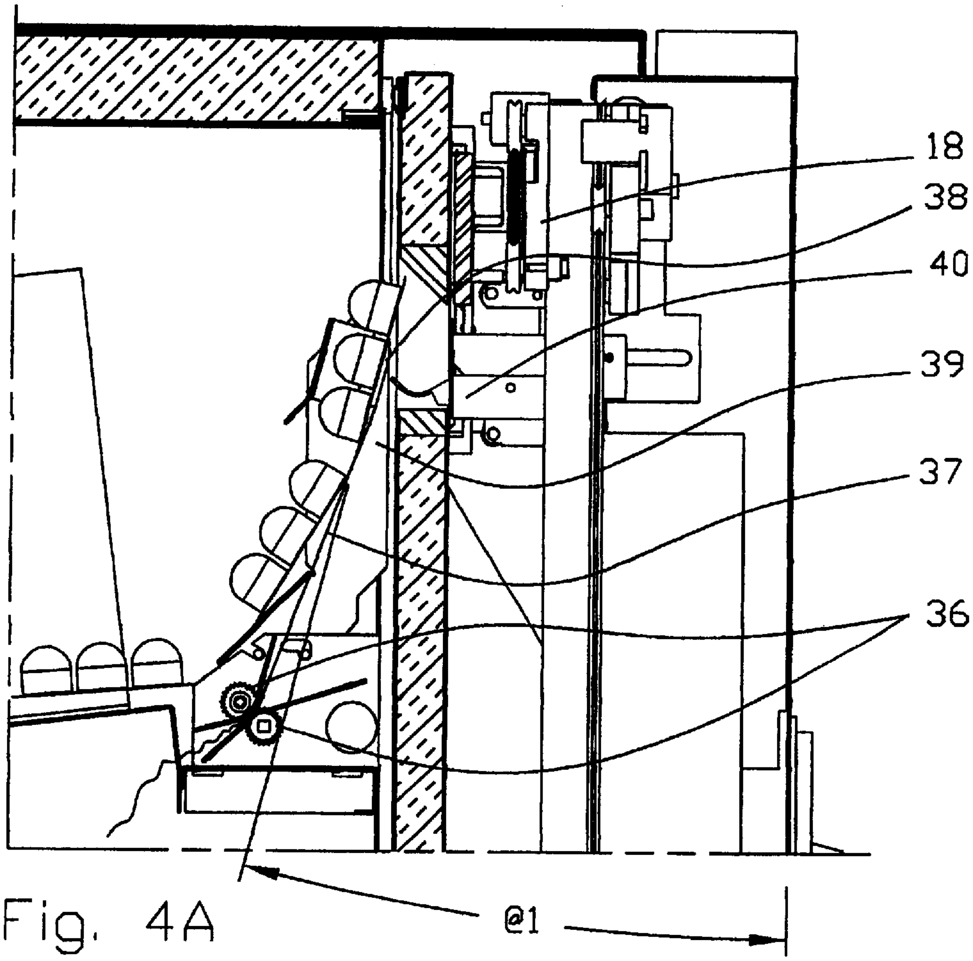
FIGS. 4A and 4B are enlarged parts of the through dispensers section.
Figure 4B:
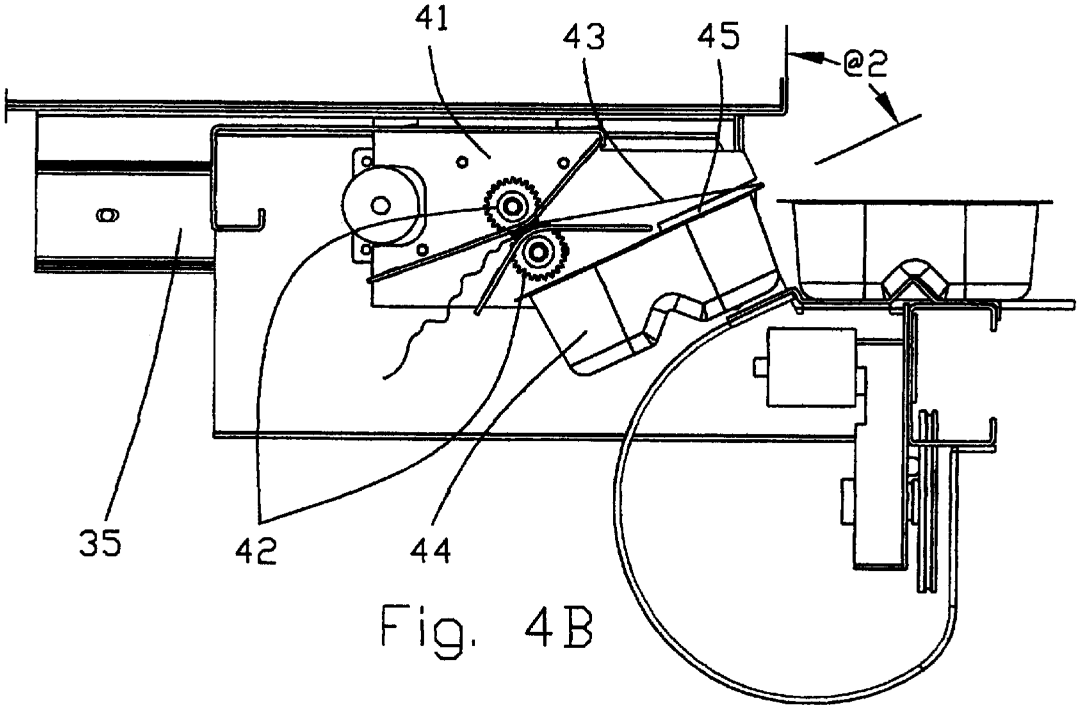
Figure 5:
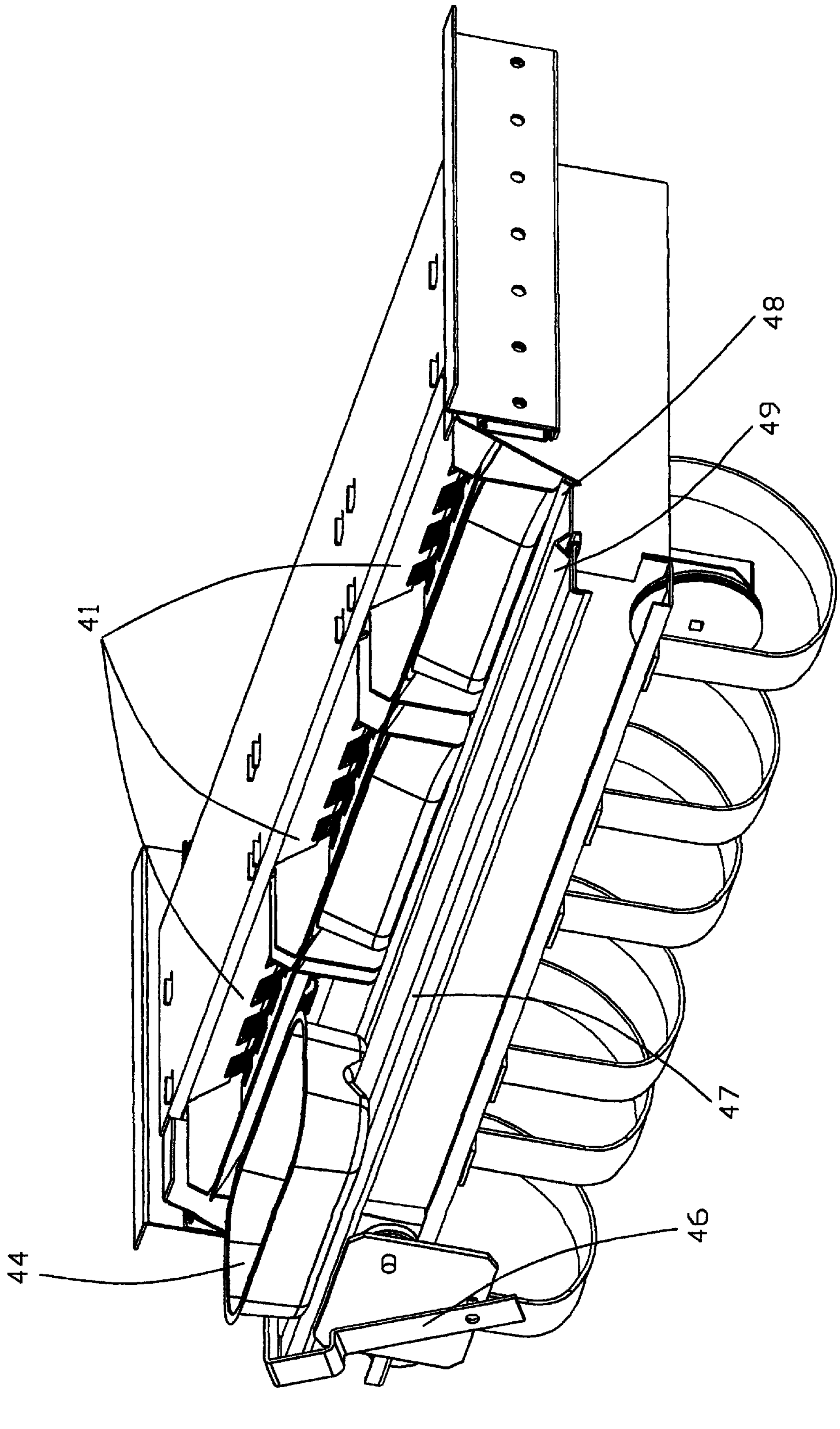
FIG. 5 shows perspective view of a tray guide with tray dispensers.

Sausage storage 23 (FIG. 4) has shelves with removable sausage magazines 33 that hold multi-nest sausage trays 34. Magazines 33 have open top and front sides. Guide 31 attaches to storage 23 with slides 35 for accessibility. The sausage dispenser (FIG. 4A) has pinions 36 for pulling peel off tape 37 with attached trays 34 around guide 38. Guide 38 is on @1 angle to front plane of the machine and it is a part of guiding frame 39 that can be pivoted for sausage reloading. Positioning device 18 has tilting support 40 that is spring loaded up. Tray dispenser 41 (FIG. 4B) has pinions 42 for pulling peel off tape 43 with attached trays 44 around guide 45 which is on @2 angle to front plane of the machine. Angles @1 and @2 are from 5 to 45 and from 45 to 85 degrees clockwise respectively. Tray guide 31 houses tray dispensers 41 along a path of a pivoting pusher 46. Means for support and guidance of trays 44 after their separating from tape 43 include surface 47 (FIG. 5) with threshold 48 and curb 49 that are conformed to bottom shape of said trays. Positioning device 18 (FIG. 6) has stationary lever 50 for opening covers 20 and spring loaded up tilting lever 51 for opening covers 21.

The apparatus in accordance with present invention operates in the following manner:

Normally, positioning device 18 stays against oven 25 with support 40 inserted in it. At the start, device 18 shuttles support 40 out (FIG. 6) and moves horizontally to lateral alignment with designated sausage dispenser 24. At this location device 18 moves vertically to said dispenser. If said dispenser is located in top row (FIG. 4A), lever 50 engages cover 20 and opens correspondent opening 22. Lever 51 engages cover 21 to reach dispenser 24 in lower row. Support 40 shuttles into opening 22 to a close proximity of guide 38. Pinions 36 pull tape 37 until a sausage is released from tray 34. Device 18 moves in reverse to described above order and inserts the sausage into oven 25, where said sausage is heated.

Independently, designated tray dispenser 41, by pulling tape 43 over guide 45 with pinions 42, releases a bun tray 44 onto surface 47. Pusher 46 moves tray 44 along tray guide 31 onto landing 29. Elevator 28 lifts tray 44 into oven 26 (FIG. 6A), where the bun is heated. After that, elevator 28 lowers tray 44 out of oven 26 and said oven shuttles out to free for landing 29 the way up.

Dispensers 16 independently dispense condiments through shoot 17 into cup 14.

Elevator 28 lifts tray 44 (FIG. 6B) and, at approximately the same time, device 18 removes support 40 with the sausage from oven 25 and lowers said support. At predetermined location support 40 tilts and releases the sausage into tray 44. Support 40 and lever 51 may be tilted, for example, by a stop attached to door 19. Elevator 28 lowers tray 44 so that landing 29 is just below part 27. Oven 26 shuttles to starting position, pushing tray 44 onto shelf 13. To complete the cycle, device 18 and elevator 28 return to starting position and, if within certain time the cycle is not repeated, oven 25 sterilizes support 40.

Figure 3A:
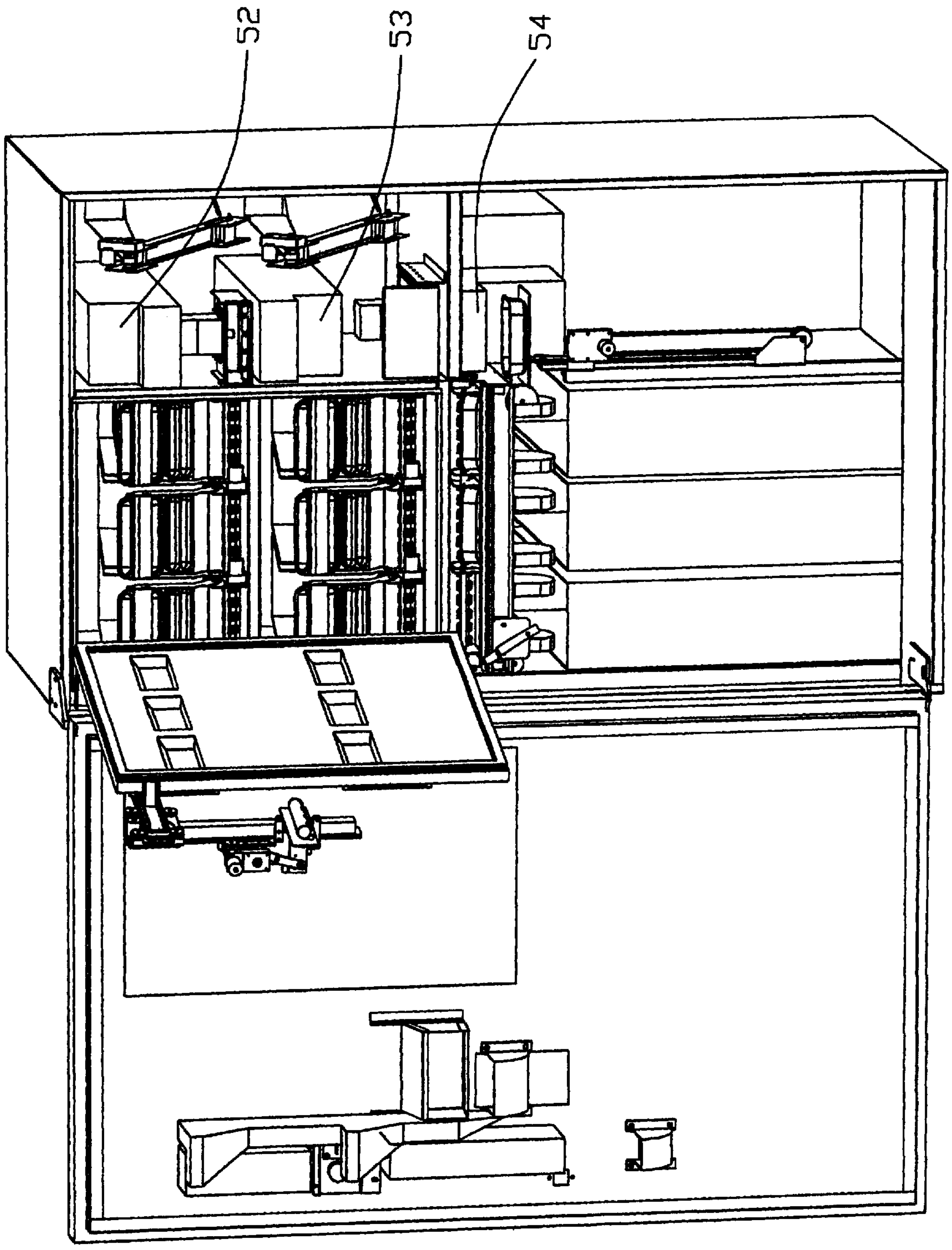

According to another embodiment (FIG. 3A), the apparatus has optional dispensers 52,53, and 54. These dispensers may be any devices known in the art for dispensing and spreading either single piece, shredded, or paste food product.

Operation differs in the following respect:

After tray 44 displaced onto landing 29, elevator 28 either may lower the landing to receive a component from dispenser 54 or raise it for interaction with dispensers 52 and 53. Depending on components selection and requirements to actual finished food product, components from dispensers 52,53, and 54, may be received before and after heating of the contents of tray 44 in oven 26. Said components may be dispensed by either of the dispensers after the sausage is placed, in which case, after that, elevator 28 moves accordingly before stopping landing 29 at part 27.

Accordingly, the present invention provides improved sanitary conditions because the apparatus has only one food contacting part, which is automatically sterilized. The method provides for decreasing preparation time because of independent and concurrent handling of the components. Improved finished food product quality is due to independent and optimal storage and heating conditions for each of the components. The apparatus provides for wide product selection, and optimal component storage capacities. It also affords a consumer a clear view of the process that fosters consumer's confidence in the product quality and entertains the consumer during the preparation time.

Although the description above contains much specificity, it should not be construed as limiting the scope of the invention but as merely providing illustrations of some of the presently preferred embodiments of this invention. For example, the top and bottom components can be different from the above-described shape, which may command different support, tray, and tray guide design. The components can require environmental conditions that differ from described above so, that the storage designs may be different too. It is also conceivable to have more than one top component in finished product, in which case either the support can be adapted to collect and release multiple articles or components can be handled one at a time.

Thus the scope of the invention should be determined by the appended claims and their legal equivalents, rather than by the examples given.

What is claimed is:

1. A method for preparing and dispensing a combination of food products in a vending machine with a product delivery opening from a selection of components wherein individual components are prepackaged in a plurality of trays sealed with a single peel off tape comprising the steps of:

providing stationary means for thermal processing and moveable means for thermal processing, said stationary means for thermal processing and said moveable means for thermal processing laterally aligned with said product delivery opening, dispensing a first tray containing a bottom component by pulling a first single peel off tape over a tray guide positioned at 45 to 85 degrees angle clockwise in relation to the front plane of said vending machine, placing a support proximate to a second tray with a top component, releasing said top component from said second tray onto said support by pulling a second single peel off tape under a guide positioned at 5 to 45 degrees angle clockwise in relation to said front plane, moving said support away from said guide in a direction to said front plane until said support is clear for lateral displacement, moving said top component and said first tray independently along said front plane until said top component and said first tray are laterally aligned with said delivery opening, said stationary means for thermal processing, and said moveable means for thermal processing, moving said top component in a direction away from said front plane into said stationary means for thermal processing while independently raising said first tray into said moveable means for thermal processing;

heating said top component and said first tray;

lowering said first tray and displacing said moveable means for thermal processing out of the tray path, raising said first tray past said moveable means for thermal processing while independently removing said top component from said stationary means for thermal processing and lowering said top component to a close proximity of said first tray, releasing said top component into said first tray, thereby forming a combination of food products in said first tray, aligning said first tray vertically with said delivery opening and said moveable means for thermal processing, and placing said moveable means for thermal processing in a starting position, thereby dispensing said combination of food products.

2. The method according to claim 1, further comprising the step of dispensing at least one additional component into said first tray before raising said first tray into said moveable means for thermal processing.

3. The method according to claim 1, further comprising the step of dispensing at least one additional component into said first tray after displacing said moveable means for thermal processing.

4. The method according to claim 1, further comprising the step of dispensing at least one additional component into said first tray after releasing said top component into said first tray.

5. An apparatus for preparing and dispensing a combination of food products in a vending machine with a product delivery opening from a selection of components wherein individual components are prepackaged in a plurality of trays sealed with a single peel off tape comprising: means for dispensing top components toward the front of said vending machine; means for dispensing bottom components toward the front of said vending machine; means for three-dimensional positioning of a releasable support for said top components; means for lateral displacement of a first tray containing a bottom component; stationary means for thermal processing; moveable means for thermal processing; and means for vertical displacement of said first tray; said stationary means for thermal processing, moveable means for thermal processing, and means for vertical displacement of said first tray aligned laterally with said product delivery opening.

6. The apparatus according to claim 5, further comprising a door located in front of the apparatus, wherein said door has a viewing window, said window located in front of said means for dispensing top components and said means for dispensing bottom components.

7. The apparatus according to claim 5, further comprising means for dispensing additional components aligned laterally with said product delivery opening.

8. The apparatus according to claim 5, wherein said means for lateral displacement of a first tray containing a bottom component comprise means for tray guiding and wherein said first tray comprises means for cooperating with said means for tray guiding.

9. The apparatus according to claim 5, further comprising means for dispensing additional prepackaged components connected to a separate product delivery opening.

10. The apparatus according to claim 5, wherein said means for dispensing top components are located inside a refrigerated compartment having a door.

11. The apparatus according to claim 10, wherein said means for three-dimensional positioning of a releasable support for said top components are attached to said door of said refrigerated compartment, said door further comprising:

openings with covers located in front of each of said means for dispensing top components, and means for cooperating with said covers, wherein said means for cooperating are attached to said means for three-dimensional positioning of a releasable support for said top components.

12. The apparatus according to claim 10, further comprising means for horizontal displacement of said means for lateral displacement of a first tray containing a bottom component together with said means for dispensing of bottom components.

* * * * *